(12) United States Patent
Bolton et al.

(10) Patent No.: US 10,250,762 B2
(45) Date of Patent: Apr. 2, 2019

(54) MOBILE CLOUD-BASED REGISTRATION SSYTEM

(71) Applicant: Electronic Exposition Information Technology, Inc., St. George, UT (US)

(72) Inventors: Edgar Bolton, St. George, UT (US); Gary Bolton, Briarcliff, TX (US); James LeCroy, Ventura, CA (US); Rick Bradd, Port Hueneme, CA (US); Andy Pardue, Ventura, CA (US)

(73) Assignee: Electronic Exposition Information Technology, Inc., St. George, UT (US)

( * ) Notice: Subject to any disclaimer, the term of this patent is extended or adjusted under 35 U.S.C. 154(b) by 0 days.

(21) Appl. No.: 15/830,637

(22) Filed: Dec. 4, 2017

(65) Prior Publication Data

US 2018/0159992 A1 Jun. 7, 2018

Related U.S. Application Data

(60) Provisional application No. 62/430,217, filed on Dec. 5, 2016.

(51) Int. Cl.
  *H04N 1/00* (2006.01)
  *G07C 9/00* (2006.01)
  *G07C 11/00* (2006.01)

(52) U.S. Cl.
  CPC ..... *H04N 1/00328* (2013.01); *G07C 9/00031* (2013.01); *G07C 11/00* (2013.01); *H04N 1/00214* (2013.01); *H04N 1/00493* (2013.01)

(58) Field of Classification Search
  None
  See application file for complete search history.

(56) References Cited

U.S. PATENT DOCUMENTS

| | | | | |
|---|---|---|---|---|
| 8,219,542 | B2* | 7/2012 | Niejadlik | H04L 63/10 707/709 |
| 9,367,552 | B1* | 6/2016 | Williams | G06F 3/1268 |
| 2003/0038965 | A1* | 2/2003 | Simpson | G06K 15/00 358/1.15 |
| 2012/0215571 | A1* | 8/2012 | Bracken | G06Q 10/10 705/5 |

* cited by examiner

*Primary Examiner* — Thomas D Lee
(74) *Attorney, Agent, or Firm* — Workman Nydegger (57) ABSTRACT

Allowing for event attendees to print customized event badges may include receiving registration information associated with a particular attendee of a specified event. In response to receiving the registration information, a confirmation message that includes at least one user-selectable link is sent to the particular attendee. In response to interaction with the user-selectable link, information associated with an individual attempting to print a badge associated with the specified event is received. Based on the received information, the individual is determined to be the particular attendee. In response to determining, a user interface that allows for selecting a particular printer to be used for printing the customized event badge associated with the particular attendee is provided. A selection of the particular printer to be used for printing the customized event badge associated with the particular attendee is received. The customized event badge at the particular printer is printed.

21 Claims, 3 Drawing Sheets

MOBILE CLOUD-BASED REGISTRATION SSYTEM

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email. In some cases, computer systems are configured to communicate with each other using network protocols. Such computer systems can communicate with cloud servers configured to provide cloud services including software applications.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to allowing event attendees to access information for an event and print customized event badges. For example, embodiments may include receiving registration information associated with a particular attendee of a specified event. Embodiments may further include, in response to receiving the registration information, sending a confirmation message to the particular attendee. The confirmation message may include one or more information links and a user-selectable link associated with selecting a printer for printing a customized event badge associated with the particular attendee and the specified event.

Embodiments may further include, in response to interaction with the user-selectable link, receiving information associated with an individual attempting to print a badge associated with the specified event. Based on the received information, the individual is determined to be the particular attendee. In response to determining that the individual is the particular attendee, a user interface is provided that allows for selecting a particular printer to be used for printing the customized event badge associated with the particular attendee. Embodiments may further include receiving a selection of the particular printer to be used for printing the customized event badge associated with the particular attendee, and printing the customized event badge at the particular printer.

In this way, a user can initiate the printing of a customized badge by selecting a received user-selectable link (or icon), followed by submitting an assigned printer name. As such, the attendee does not need a bar code or QR CODE, while the event center does not need to provide a large registration section with multiple laptop or desktop computer systems. Once the user has interacted with the received user-selectable link, one or more server computer systems may analyze information associated with the attendee to verify that the attendee has indeed registered for the event. Upon verification, the one or more server computer systems may provide a user interface for selecting a particular on-site printer, and thus allow the attendee to make such a printer selection. The selected printer may then receive instructions associated with printing a badge customized for the attendee and the event being attended.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to allowing event attendees to print customized event badges. For example, embodiments may include receiving registration information associated with a particular attendee of a specified event. Embodiments may further include, in response to receiving the registration information, sending a confirmation message to the particular attendee. The confirmation message may include, in addition to other links, a user-selectable link associated with selecting a printer for printing a customized event badge associated with the particular attendee and the specified event.

Embodiments may further include, in response to interaction with the user-selectable link, receiving information associated with an individual attempting to print a badge associated with the specified event. Based on the received information, the individual is determined to be the particular attendee. In response to determining that the individual is the particular attendee, a user interface is provided that allows for selecting a particular printer to be used for printing the customized event badge associated with the particular attendee. Embodiments may further include receiving a selection of the particular printer to be used for printing the customized event badge associated with the particular attendee, and printing the customized event badge at the particular printer.

In this way, a user can initiate the printing of a customized badge by selecting a received user-selectable link (or icon), followed by submitting an assigned printer name. As such, the attendee does not need a bar code or QR CODE, while the event center does not need to provide a large registration section with multiple laptop or desktop computer systems. Once the user has interacted with the received user-selectable link, one or more server computer systems may analyze information associated with the attendee to verify that the attendee has indeed registered for the event. Upon verification, the one or more server computer systems may provide a user interface for selecting a particular on-site printer, and thus allow the attendee to make such a printer selection. The selected printer may then receive instructions associated with printing a badge customized for the attendee and the event being attended.

Some introductory discussion of a computing system will be described with respect to FIG. 1. Then printing a customized event badge will be described with respect to FIGS. 2 and 3.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
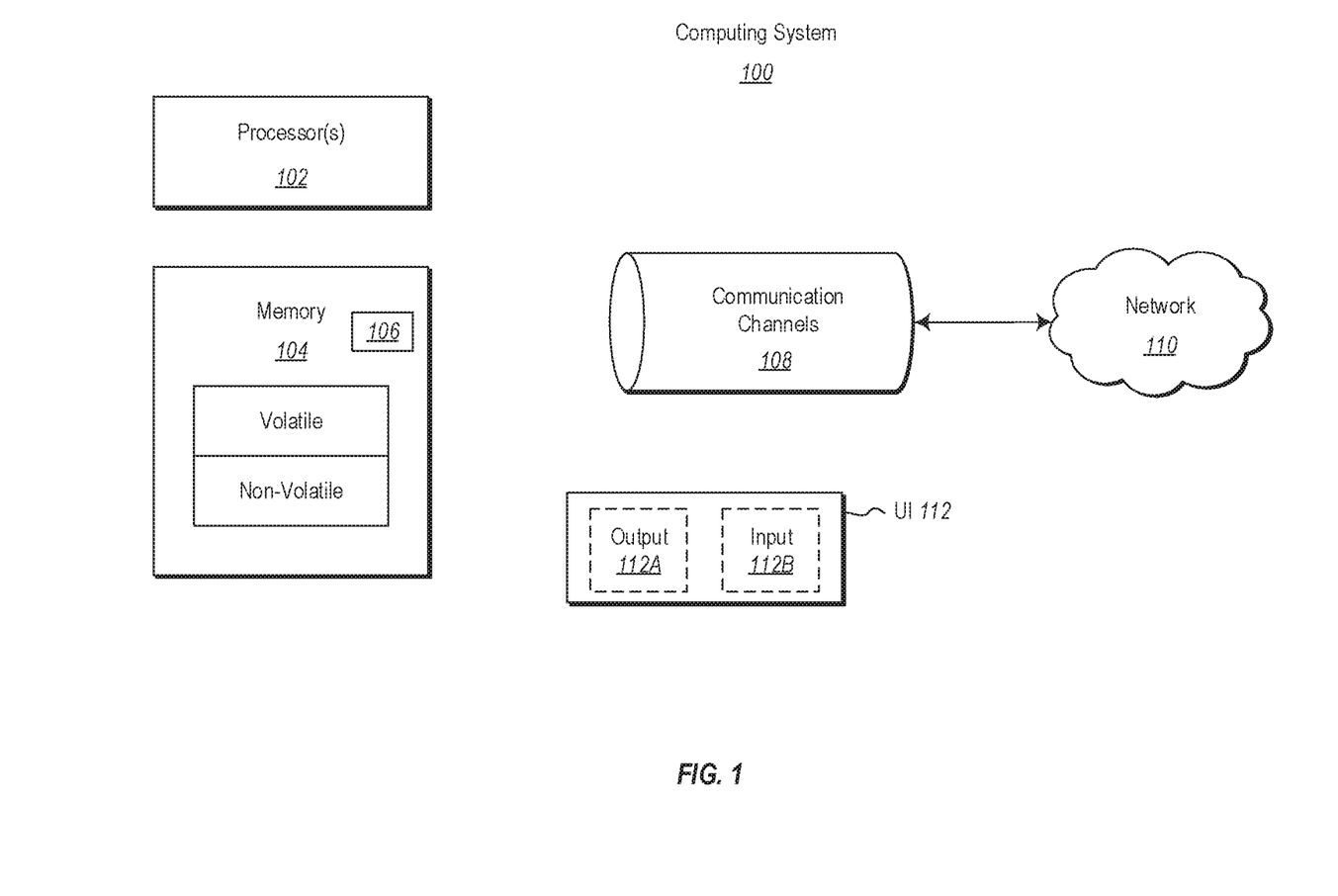
FIG. 1 illustrates an example computer architecture that facilitates operation of the principles described herein.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Traditionally, when a user has attended an event (e.g., a convention, tradeshow, or other similar event), the user would register, pay a fee, and receive an event confirmation with a code (e.g., a bar code, a QR CODE, and so forth). The user (i.e., the attendee) would then bring the received code to the event. Once at the event (e.g., a convention center), the user would be required to scan the code at a first computer system (e.g., a scanner), and in response to scanning the code, a second computer system would print an identification badge for the user. However, a mobile registration platform, as described herein, allows event attendees to print customized event badges without having to scan a bar code, scan a QR CODE®, utilize Near Field Communication (NFC) devices, or access an on-site event registration computer system (e.g., a desktop computer system, a laptop computer system, and so forth). Accordingly, the mobile registration platform described herein allows event planners to use minimal hardware, as well as minimal staff. As such, the mobile registration platform described herein may remove location dependence based at least partially on such use of minimal hardware (i.e., previous selections of event locations were often based on equipment requirements). Additionally, the mobile registration platform is scalable, intuitive to use, and mobile.

Figure 2:
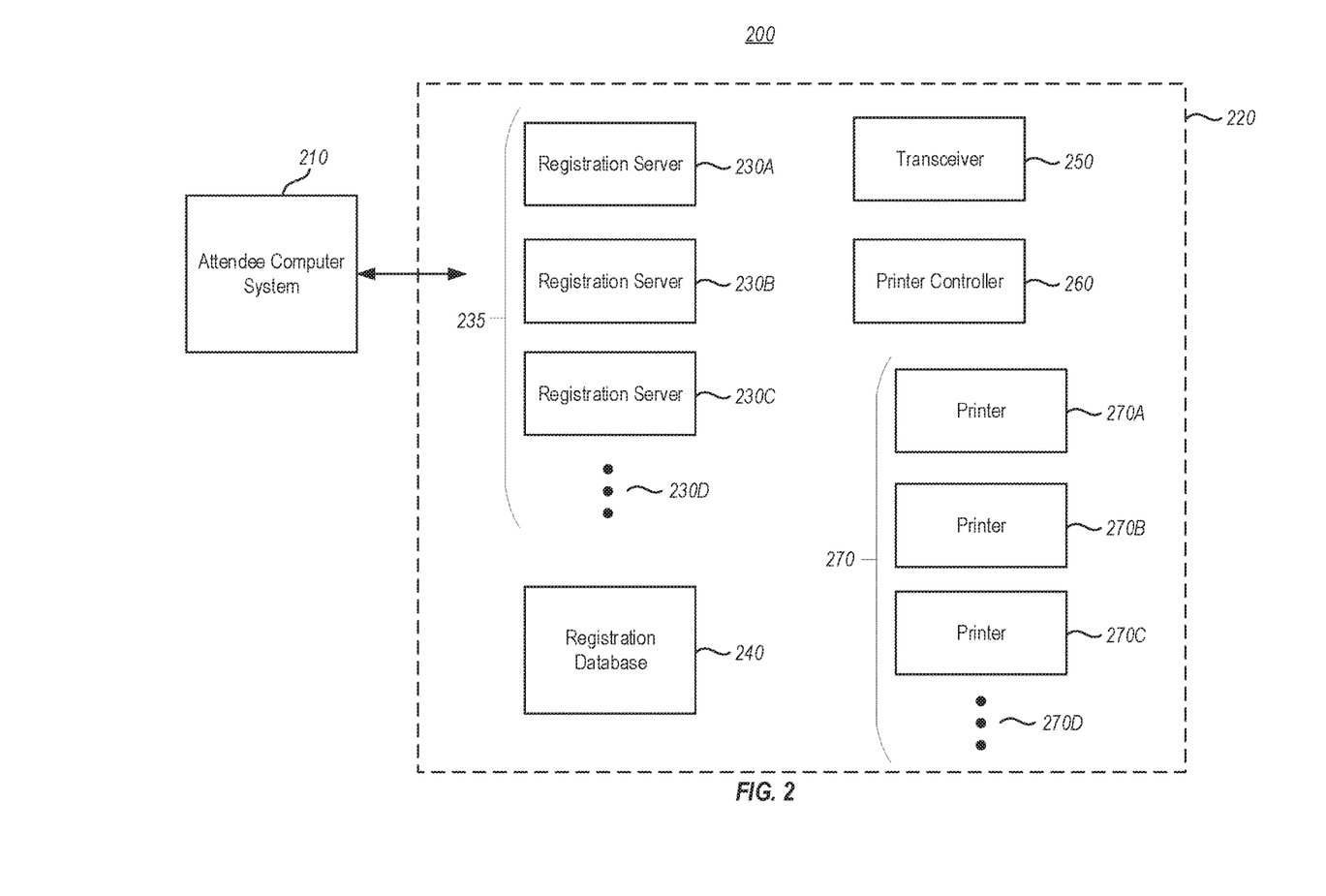
FIG. 2 illustrates an example environment for printing customized event badges.

FIG. 2 illustrates an exemplary environment 200 for allowing event attendees (e.g., conferences) to print customized event badges while avoiding having to scan a bar code, scan a QR CODE, or access an event registration computer system (e.g., a desktop computer system, a laptop computer system, and so forth located at a given event) provided at the event. As illustrated, environment 200 includes an attendee computer system 210, as well as a mobile registration platform 220. As shown, the mobile registration platform may include various components, including registration servers 230 (i.e., registration server 230A through registration server 230C), registration database 240, transceiver 250, printer controller 260, and printers 270 (i.e., printer 270A through printer 270C).

Notably, while only three registration servers 230 and three printers 270 are shown, ellipses 230D and ellipses 270D illustrate that there may be any number of registration servers 230 and printers 270, respectively. These components may be implemented on a local computer system or may be implemented on a distributed computer system that includes elements resident in the cloud or that implement aspects of cloud computing (i.e., at least one of the various illustrated components may be implemented locally, while at least one other engine may be implemented remotely). Additionally, in some embodiments, one or more of these components may combined with others of these components (e.g., the transceiver with a registration server, the printer controller with a printer, and so forth).

The attendee computer system 210 may correspond to the computer system 100, as described with respect to FIG. 1. The attendee computer system 210 may comprise any type of computer system that is capable of receiving input associated with registering a user (e.g., a potential attendee) of an event. In an example, the attendee computer system 210 may comprise a desktop computer, a laptop computer, a tablet, a smartphone, and so forth. Furthermore, the attendee computer system 210 may be running any applicable operating system, including but not limited to, MICROSOFT® WINDOWS®, APPLE® MACOS®, APPLE IOS®, GOOGLE™ CHROME OS™, ANDROID™, and so forth.

Accordingly, a user (e.g., a potential attendee, an employee of an event that is responsible for submitting registration information, and so forth) may utilize the attendee computer system 210 for registering individuals for events (e.g., tradeshows, conferences, conventions, meetings, and so forth). In an example, a user may use the attendee computer system 210 to register to attend a particular business conference. Such registration may include submitting various registration information about the user (e.g., name, telephone number, home address, employer, job title, credit card information, and so forth), as well as information about the conference(s) to be attended at the attendee computer system 210. Registering for an event using the attendee computer system 210 may generate registration information that comprises information related to a future attendee (e.g., attendee name, attendee telephone number, and so forth) and the event to be attended. The attendee computer system may then send (e.g., via the Internet) the generated registration information to the mobile registration platform 220. In some embodiments, such registration may occur in advance of the event (e.g., days, weeks, months, and so forth prior to the event).

Upon sending the registration information, the mobile registration platform 220, and ultimately, one or more of the registration servers 210 (i.e., registration server 210A through registration server 210C) may receive the registration information. While only three registration servers are shown (i.e., registration server 210A through registration server 210C), ellipses 210D represents that any number of registration servers 210 may be utilized within the mobile registration platform 200. The registration servers 210 may each comprise any type of applicable computer system, including dedicated server computer systems, desktop computer systems, laptop computer systems, and so forth. Regardless of the type of computer system used, each registration server may be capable of receiving the registration information.

Upon receiving the registration information, the one or more servers 230 may store the registration information at the registration database 240, which is accessible by each of the registration servers 230. While the registration database 240 is illustrated in FIG. 2 as being separate from the registration servers 230, the registration database may comprise part of one or more of the registration servers 230. In addition, the one or more servers 230 that received the registration information may send a confirmation message (e.g., an email, Short Message Service (SMS), and so forth) associated with an individual registering to attend the event. For instance, the confirmation message may include information about the event (e.g., location, time, and so forth), as well as any relevant information/instructions associated with the event (e.g., a confirmation number, parking information, directions, appropriate dress, and so forth).

The confirmation message may also include, in addition to information links (as further described herein), a user-selectable link or a user-selectable icon that allows a user to, upon arriving at the event, select one of the printers 270 for printing a customized event badge. In other embodiments, the user-selectable link/icon may be sent by one of the servers 230 as part of a separate message for a future attendee of the event. Regardless of the way in which a selectable link/icon is sent to a user, the user may utilize the selectable link/icon for printing a customizable badge. In addition to the selectable link/icon for selecting a printer, a plurality of other selectable links/icons associated with participation in an event may be sent within a registration confirmation email/text or within separate messages. For instance, other selectable links/icons may be associated with event location information (e.g., address, directions), maps of the event, meeting scheduling, surveys, any special instructions or access privileges associated with an event, tools for preparing for an event, items/equipment to bring to an event, and so forth. Notably, while links associated with particular types of information are enumerated herein, links associated with essentially any type of information corresponding to an event may be sent to a registered future attendee of an event. Notably, in some embodiments, registration (as well as printing badges, identification of attendees, and so forth, as further described herein) may be performed by an attendee (or potential attendee) solely via a web browser (i.e., without requiring an attendee or potential attendee to download/install any additional software applications).

Furthermore, while a QR CODE may not generally be necessary when practicing the principles described herein, a QR CODE may also be provided in a registration confirmation message for backup purposes to allow for flexibility at an event site (i.e., another method in which an attendee can be identified and/or print an event badge). The registration confirmation message may also include a selectable link/icon associated with allowing a user to opt-in or opt-out of receiving text messages (e.g., SMS messages, Multimedia Messaging Service (MMS) messages, and so forth) associated with an event. For instance, an attendee that opts-in to text messaging may receive messages associated with changes in the initial plans of an event, event reminders, or communications directly from management of an event (e.g., while at the event).

As briefly discussed, the mobile registration platform 220 also includes a transceiver 250 that is configured to transmit and receive data over wired or wireless connections (e.g., over the Internet). For instance, the transceiver 250 may be configured to communicate with the one or more servers via a wired or wireless connection. More particularly, the transceiver may receive communications from attendees at an event and send such communications to one or more of the registration servers 230. In an example, the selectable link/icon used for selecting a printer may also function as a confirmation that a given attendee is indeed registered for a particular event, and is thus, able to print a customized badge.

In a more particular example, assume an attendee has arrived at an event for which the attendee has registered. Upon arrival, the attendee may select the selectable link (e.g., within a confirmation email) for choosing a printer using a device (e.g., the attendee's own smartphone). Upon selecting the link, an identification communication associated with information corresponding to the attendee may initially be sent to the transceiver 250. For instance, the identification communication may include the attendee's name, a confirmation number associated with registering for the event, and so forth. The transceiver may then forward the identification communication to one or more of the servers 230. The servers may then verify the information within the identification communication against the registration information stored for each individual registered for a particular event within the registration database 240. Upon verification that the attendee has indeed registered for the event, the registration servers 230 may each be configured to instantiate or execute a software application, web application, or webpage that can receive the event attendee's selection of printer and any other applicable information, as further described herein.

Accordingly, upon verification of an attendee and the attendee selecting the user-selectable icon or user-selectable link within a user interface of a device (e.g., a smartphone, a tablet, a laptop computer system, and so forth), the user interface may automatically navigate to a webpage (i.e., within a browser), or automatically open a software application, that allows the attendee to select one of the printers 270 (i.e., at which a customized badge may be printed). As such, each printer of the mobile registration platform may be assigned a name (e.g., a series of numbers, letters or other symbols). For instance, a printer may be assigned "A1" or "B3." In such an example, an attendee can then select a particular printer by submitting the assigned name (e.g. "A1") of the printer into the webpage or software application. An identification of the selected printer may then be sent from a server 230 to the transceiver 250 or the printer controller 260, or may be sent directly from a device of the attendee (e.g., a smartphone) directly to the transceiver or printer controller.

Additionally, upon verification of an attendee and the attendee selecting the user-selectable icon or user-selectable link within a user interface of a device, one or more of the servers 230 may use information associated with the attendee (e.g., information stored at the registration database, information within the identification communication, and so forth) to generate a customized badge design. For instance, such a badge design may include information corresponding to the attendee (e.g., the attendee's name, the attendee's job title, the attendee's employer, and so forth), as well as information corresponding to the event (e.g., a name of the event being attended). The generated badge design may then be sent to the transceiver 250. The transceiver may then communicate both the badge design and the selected printer to the printer controller 260. The printer controller may then communicate with the selected printer to cause the selected printer to print the customized badge. As such, the printer controller may generate printer commands readable by a printer to print a badge according to a badge design.

Notably, in some embodiments, the transceiver 250 may be configured to automatically connect to one or more of the servers 230 and/or to the Internet in order to poll for attendee input associated with selecting a printer. The transceiver may thus listen for inputs that would indicate that a printer has been selected and that a badge is to be printed. Furthermore, in some embodiments, a geolocation signal (e.g., Global Positioning System (GPS)) may be requested from each given attendee that attempts to print a badge. Such geolocation information may be used to verify that the given attendee is actually at the event before printing the badge. For instance, the one of the registration servers 230 may send a request to the attendee (e.g., a device of the attendee) to request the device's current GPS coordinates. Additionally, or alternatively, one or more of the registration servers 230 may utilize WI-FI®, BLUETOOTH®, or any other suitable wireless communication protocols associated with the attendee's electronic device to determine the attendee's current location.

Other forms of security and authentication may also be used in conjunction with the mobile registration platform 220 to verify a registered attendee's identity. For instance, a password may be required for each attendee to access registration confirmation data. As such, a device for each attendee may provide a first level of identification security (e.g., via a fingerprint sensor, a passcode, a password, and so forth), while requiring a password specific to registration confirmation information may serve as a second level of security. Alternatively, or additionally, a picture of each attendee may be required as part of registration (e.g., during registration the future attendee can submit an already taken picture or a "selfie" taken during registration). The picture used at registration may then be used as another form of verification for each attendee. For instance, in some embodiments, printed badges may include the picture of the attendee that was supplied at registration.

Figure 3:
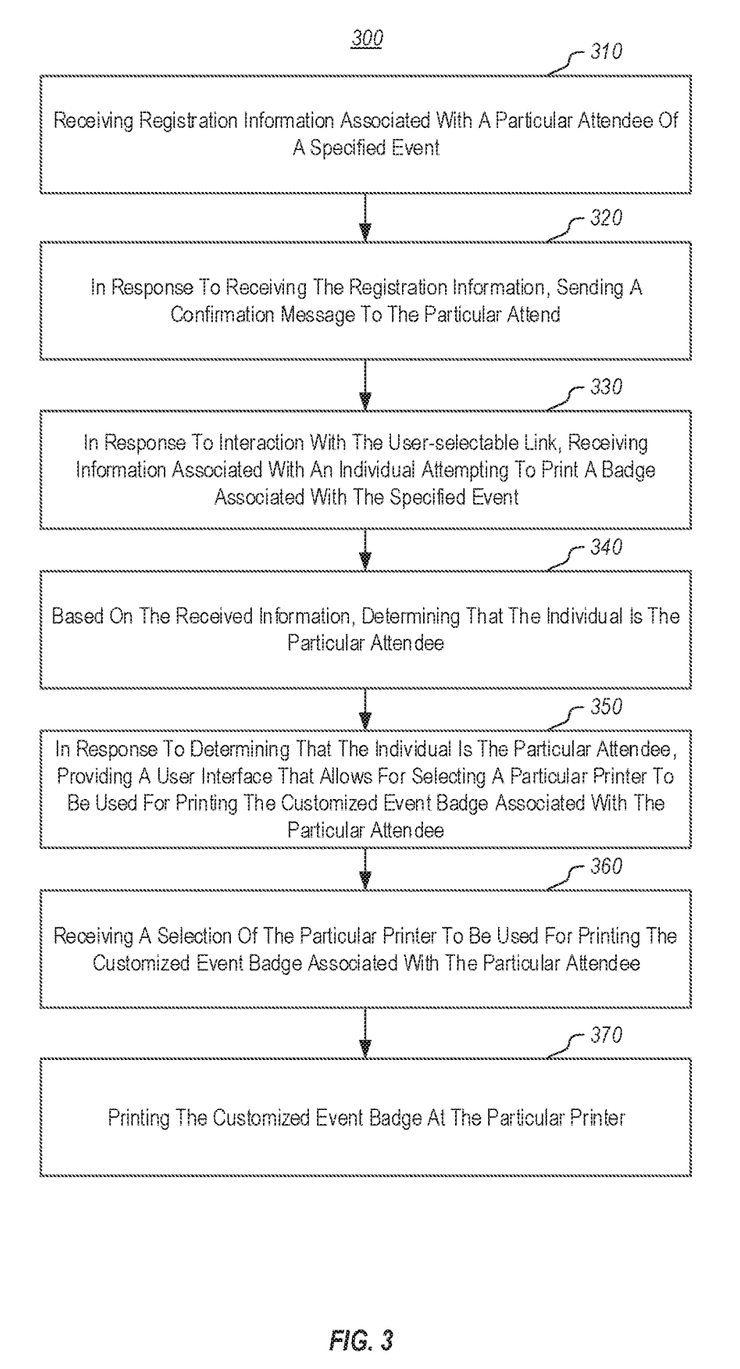
FIG. 3 illustrates a flowchart of a method for printing customized event badges.

FIG. 3 illustrates a flowchart of a method 300 for allowing event attendees to print customized event badges. The method 300 is described with frequent reference to the environment 200 of FIG. 2. The method 300 includes receiving registration information associated with a particular attendee of a specified event (Act 310). For instance, one of the registration servers 230 may receive registration information associated with a particular user registering for a specified event. The method 300 may further include, in response to receiving the registration information, sending a confirmation message to the particular attendee (Act 320). For instance, in response to receiving registration information associated with a future attendee of a specified event, one of the servers 230 may send a confirmation message (e.g., email, text, and so forth) associated with successful event registration. Notably, the confirmation message may include a user-selectable link associated with selecting a printer for printing a customized event badge associated with the particular attendee and the specified event.

The method 300 may further include, in response to interaction with the user-selectable link, receiving information associated with an individual attempting to print a badge associated with the specified event (Act 330). For example, assume an attendee has arrived at an event. Upon arriving, the attendee may attempt to interact with a received selectable link/icon received as part of a confirmation message. In particular, the selectable link/icon may be associated with printing a customized badge corresponding to the attendee. In response to interacting with the selectable link/icon, an identification communication associated with information relating to the attendee may be sent to one of the servers 230. The method 300 may also include, based on the received information, determining that the individual is the particular attendee (Act 340). For instance, the server 230 that received the identification communication may verify the received information related to the attendee against registration information stored at the registration database 240.

The method 300 may further include, in response to determining that the individual is the particular attendee, providing a user interface that allows for selecting a particular printer to be used for printing the customized event badge associated with the particular attendee (Act 350). For instance, upon both the attendee interacting with the selectable link/icon and one of the servers 230 verifying that the attendee is indeed registered for the event, a user interface (e.g., a browser user interface) of a device the attendee has used to interact with the selectable link/icon may automatically navigate to a user interface for selecting a particular printer at the event. The method 300 may further include receiving a selection of the particular printer to be used for printing the customized event badge associated with the particular attendee (Act 360). For example, the user may select a particular printer using the provided user interface by submitting an assigned name of one of the printers 270 at the user interface. The method 300 may also include printing the customized event badge at the particular printer (Act 370). For example, upon receiving the submitted assigned name of one of the printers 270 may result in instructions being sent to the selected printer and ultimately printing the customized badge at the selected printer.

In this way, a user can initiate the printing of a customized badge by selecting a received user-selectable link (or icon), followed by submitting an assigned printer name. As such, the attendee does not need a bar code or QR CODE, while the event center does not need to provide a large registration section with multiple laptop or desktop computer systems. Once the user has interacted with the received user-selectable link, one or more server computer systems may analyze information associated with the attendee to verify that the attendee has indeed registered for the event. Upon verification, the one or more server computer systems may provide a user interface for selecting a particular on-site printer, and thus allow the attendee to make such a printer selection. The selected printer may then receive instructions associated with printing a badge customized for the attendee and the event being attended.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A mobile registration platform configured to allow event attendees to print customized event badges, the mobile registration platform comprising:

a transceiver configured to transmit and receive registration data, the registration data comprising at least a verification associated with a specified attendee being registered for an event, and an indication that a badge is to be printed at a specified printer according to a badge design that is customized to the attendee and the event;

a printer controller configured to receive the indication from the transceiver and generate printer commands readable by a printer to print the badge according to the badge design; and a plurality of printers, wherein the specified printer is configured to print the badge according to the badge design, wherein the transceiver is further configured to request a geolocation signal from the attendee to verify that the attendee is actually at the event before printing the badge.

2. The mobile registration platform of claim 1, further comprising one or more server computer systems that are remotely accessible by communications transmitted and received through the transceiver.

3. The mobile registration platform of claim 2, wherein the one or more server computer systems are configured to instantiate an application that receives event attendee registration information and sends a confirmation message to the event attendee upon registration.

4. The mobile registration platform of claim 3, wherein the confirmation message includes a browser link that, when selected, allows the event attendee to initiating printing of the badge.

5. The mobile registration platform of claim 4, wherein the confirmation message includes a plurality of browser links other than the browser link, at least one of the plurality of other browser links being associated with information pertinent to participation in the event.

6. The mobile registration platform of claim 4, wherein initiating printing of the badge includes selecting a printer from the plurality of printers.

7. The mobile registration platform of claim 6, wherein the attendee's selection of a printer among the plurality of printers causes the one or more server computer systems to generate the verification and the indication.

8. The mobile registration platform of claim 1, wherein the mobile registration platform lacks keyboards, barcode readers, quick response (QR) code readers, and near field communication (NFC) devices.

9. The mobile registration platform of claim 1, wherein the transceiver is programmed to automatically connect to the internet and poll for attendee input associated with selecting a printer.

10. The mobile registration platform of claim 9, wherein the input from the attendee comprises a printer name identifying which printer among the plurality of printers is to be used to print the attendee's badge.

11. The mobile registration platform of claim 1, wherein a printer code identifies a specific printer and the event at which the printer is being used.

12. The mobile registration platform of claim 1, wherein unique identification data associated with a mobile electronic device associated with the attendee is used to confirm the attendee's identity.

13. The mobile registration platform of claim 12, wherein the unique identification comprises at least one of a password of the particular attendee associated with the specified event or a picture of the particular attendee.

14. A method, implemented at a computer system including one or more processors, for allowing event attendees to print customized event badges, the method comprising:
receiving registration information associated with a particular attendee of a specified event;
in response to receiving the registration information, sending a confirmation message to the particular attendee, the confirmation message including a user-selectable link associated with selecting a printer for printing a customized event badge associated with the particular attendee and the specified event; and
in response to interaction with the user-selectable link, performing at least the following:
receiving information associated with an individual attempting to print a badge associated with the specified event;
based on the received information, determining that the individual is the particular attendee;
in response to determining that the individual is the particular attendee, providing a user interface that allows for selecting a particular printer to be used for printing the customized event badge associated with the particular attendee;
receiving a selection of the particular printer to be used for printing the customized event badge associated with the particular attendee; and
printing the customized event badge at the particular printer.

15. The method of claim 14, wherein the confirmation message includes a plurality of links other than the user-selectable link, at least one of the plurality of other links being associated with information pertinent to participation in the event.

16. The method of claim of claim 14, wherein a geolocation signal is requested from the particular attendee to verify that the particular attendee is actually at the event before printing the customized event badge.

17. The method of claim of claim 14, wherein unique identification data associated with a mobile electronic device associated with the attendee is used to confirm the attendee's identity.

18. The method of claim of claim 17, wherein the unique identification comprises at least one of a password of the particular attendee associated with the specified event or a picture of the particular attendee.

19. A computer system comprising:
one or more processors; and
one or more computer-readable storage media having stored thereon computer-executable instructions that are executable by the one or more processors to cause the computer system to allow event attendees to print customized event badges, the computer-executable instructions including instructions that are executable to cause the computer system to perform at least the following:
receive registration information associated with a particular attendee of a specified event;
in response to receiving the registration information, send a user-selectable link associated with selecting a printer for printing a customized event badge associated with the particular attendee and the specified event; and
in response to interaction with the user-selectable link, perform at least the following:
receive information associated with an individual attempting to print a badge associated with the specified event;
based on the received information, determine that the individual is the particular attendee;
in response to determining that the individual is the particular attendee, provide a user interface that allows for selecting a particular printer to be used for printing the customized event badge associated with the particular attendee;
receive a selection of the particular printer to be used for printing the customized event badge associated with the particular attendee; and
print the customized event badge at the particular printer.

20. A mobile registration platform configured to allow event attendees to print customized event badges, the mobile registration platform comprising:
a transceiver configured to transmit and receive registration data, the registration data comprising at least a verification associated with a specified attendee being registered for an event, and an indication that a badge is to be printed at a specified printer according to a badge design that is customized to the attendee and the event;
a printer controller configured to receive the indication from the transceiver and generate printer commands readable by a printer to print the badge according to the badge design;
a plurality of printers, wherein the specified printer is configured to print the badge according to the badge design, and
one or more server computer systems that are remotely accessible by communications transmitted and received through the transceiver, wherein the one or more server computer systems are configured to instantiate an application that receives event attendee registration information and sends a confirmation message to the event attendee upon registration, the confirmation message includes a browser link that, when selected, allows the event attendee to initiating printing of the badge, initiating printing of the badge includes selecting a printer from the plurality of printers, the confirmation message includes a plurality of browser links other than the browser link, at least one of the plurality of other browser links being associated with information pertinent to participation in the event, the attendee's selection of a printer among the plurality of printers causes the one or more server computer systems to generate the verification and the indication.

21. A mobile registration platform configured to allow event attendees to print customized event badges, the mobile registration platform comprising:
a transceiver configured to transmit and receive registration data, the registration data comprising at least a verification associated with a specified attendee being registered for an event, and an indication that a badge is to be printed at a specified printer according to a badge design that is customized to the attendee and the event;
a printer controller configured to receive the indication from the transceiver and generate printer commands readable by a printer to print the badge according to the badge design; and
a plurality of printers, wherein the specified printer is configured to print the badge according to the badge design, wherein the transceiver is programmed to automatically connect to the internet and poll for attendee input associated with selecting a printer.

* * * * *